US008358194B2

(12) United States Patent
Baravalle

(10) Patent No.: US 8,358,194 B2
(45) Date of Patent: Jan. 22, 2013

(54) REMOTE CONTROL SYSTEM

(75) Inventor: Giacomo Baravalle, Manta (IT)

(73) Assignee: Sist & Matica S.R.L., Manta (CN) (IT)

( * ) Notice: Subject to any disclaimer, the term of this patent is extended or adjusted under 35 U.S.C. 154(b) by 241 days.

(21) Appl. No.: 12/992,041

(22) PCT Filed: May 14, 2008

(86) PCT No.: PCT/IT2008/000319

§ 371 (c)(1),
(2), (4) Date: Nov. 10, 2010

(87) PCT Pub. No.: WO2009/139010

PCT Pub. Date: Nov. 19, 2009

(65) Prior Publication Data

US 2011/0068891 A1 Mar. 24, 2011

(51) Int. Cl.
*G05B 19/02* (2006.01)

(52) U.S. Cl. .... 340/4.3; 340/4.11; 340/4.31; 340/12.22; 340/12.24; 345/156

(58) Field of Classification Search ................. 340/4.11, 340/4.12, 4.13, 4.14, 4.3, 4.42, 12.22, 12.23, 340/12.24, 13.24; 345/156, 157, 158
See application file for complete search history.

(56) References Cited

U.S. PATENT DOCUMENTS

2002/0084909 A1 * 7/2002 Stefanik et al. .......... 340/825.22
2005/0212753 A1 9/2005 Marvit et al.

FOREIGN PATENT DOCUMENTS

EP 1035529 A 9/2000

OTHER PUBLICATIONS

SIST&MATICA S.R.L. et al., International Search Report dated Jun. 4, 2009, issued in International Patent Application No. PCT/IT2008/000319, Publication No. WO 2009/139010 A1 dated Nov. 19, 2009 (2 pages).

* cited by examiner

*Primary Examiner* — Nabil Syed
(74) *Attorney, Agent, or Firm* — David A. Farah; Sheldon Mak & Anderson PC

(57) ABSTRACT

A remote control system (1) is described, in particular for regulating and controlling industrial drives, comprising at least one transmitting remote control (10) and at least one receiver (20) cooperating with the drive, such transmitting remote control (10) containing at least one inclination sensor (5).

4 Claims, 3 Drawing Sheets

REMOTE CONTROL SYSTEM

CROSS-REFERENCE TO RELATED APPLICATION

The present Application is a national stage of International Patent Application No. PCT/IT2008/000000319, titled "Remote Control System," filed May 14, 2008, the contents of which are incorporated in this disclosure by reference in their entirety.

BACKGROUND OF THE INVENTION

1. Field of the Invention

The present invention refers to a remote control system, in particular for regulating and controlling industrial drives.

2. Background Art

As known, pressures coming from the market for introducing wired or wireless control systems for driving technical arrangements, in particular aimed for industrial vehicles such as, for example, trucks, hydraulic boards, hoists, trailers, etc., provide for the need of introducing new solutions for making remote controls more and more compact, ergonomic and reliable, at the same time making the handling managing operations more and more natural for an operator.

Currently, in known control systems, the movement speed regulation of a member or a drive is performed by using remote controls made as joysticks or triggers, that are subjected to wear and breakage and that not always make the regulation operation natural for a user. Moreover, in case of need of driving a high number of functions, remote controls must forcedly be adequately sized, losing much of their ergonomy.

SUMMARY OF THE INVENTION

Object of the present invention is solving the above prior art problems by providing a remote control system whose regulation and control action is function of information deriving from the degree of inclination of a transmitting remote control belonging to the system itself.

Another object of the present invention is providing a remote control system in which its own transmitting remote control can drive a high number of functions, remaining of small sizes and keeping an adequate use ergonomy.

The above and other objects and advantages of the invention, as will result from the following description, are obtained with a remote control system as described in claim 1. Preferred embodiments and non-trivial variations of the present invention are the subject matter of the dependent claims.

It will be immediately obvious that numerous variations and modifications (for example related to shape, sizes, arrangements and parts with equivalent functionality) can be made to what is described, without departing from the scope of the invention as appears in the enclosed claims.

BRIEF DESCRIPTION OF THE DRAWINGS

The present invention will be better described by some preferred embodiments thereof, provided as a non-limiting example, with reference to the enclosed drawings, in which.

DETAILED DESCRIPTION OF PREFERRED EMBODIMENTS

With reference to the Figures, the remote control system according to the present invention will be described below in the particular case, but wholly as an example, in which it is used for regulating and driving industrial drives such as equipment for industrial vehicles. It is anyway clear that the system according to the present invention can be used for driving any other type of drives, without therefore departing from the scope of the present invention.

In general, the remote control system according to the present invention, comprising at least one transmitting remote control, uses information related to the degree of inclination of such remote control for translating operator's "intentions" dealing with direction and speed to be given to the controlled drive: in this context, as will be described below in more detail, the system according to the present invention can therefore be advantageously applied both to commands of the ON/OFF type and to commands of the proportional type.

With reference to the Figures, it is possible to note that the remote control system 1 according to the present invention therefore comprises at least one transmitting remote control 10 and at least one receiver 20, the transmitting remote control 10 containing at least one inclination sensor.

Figure 1:
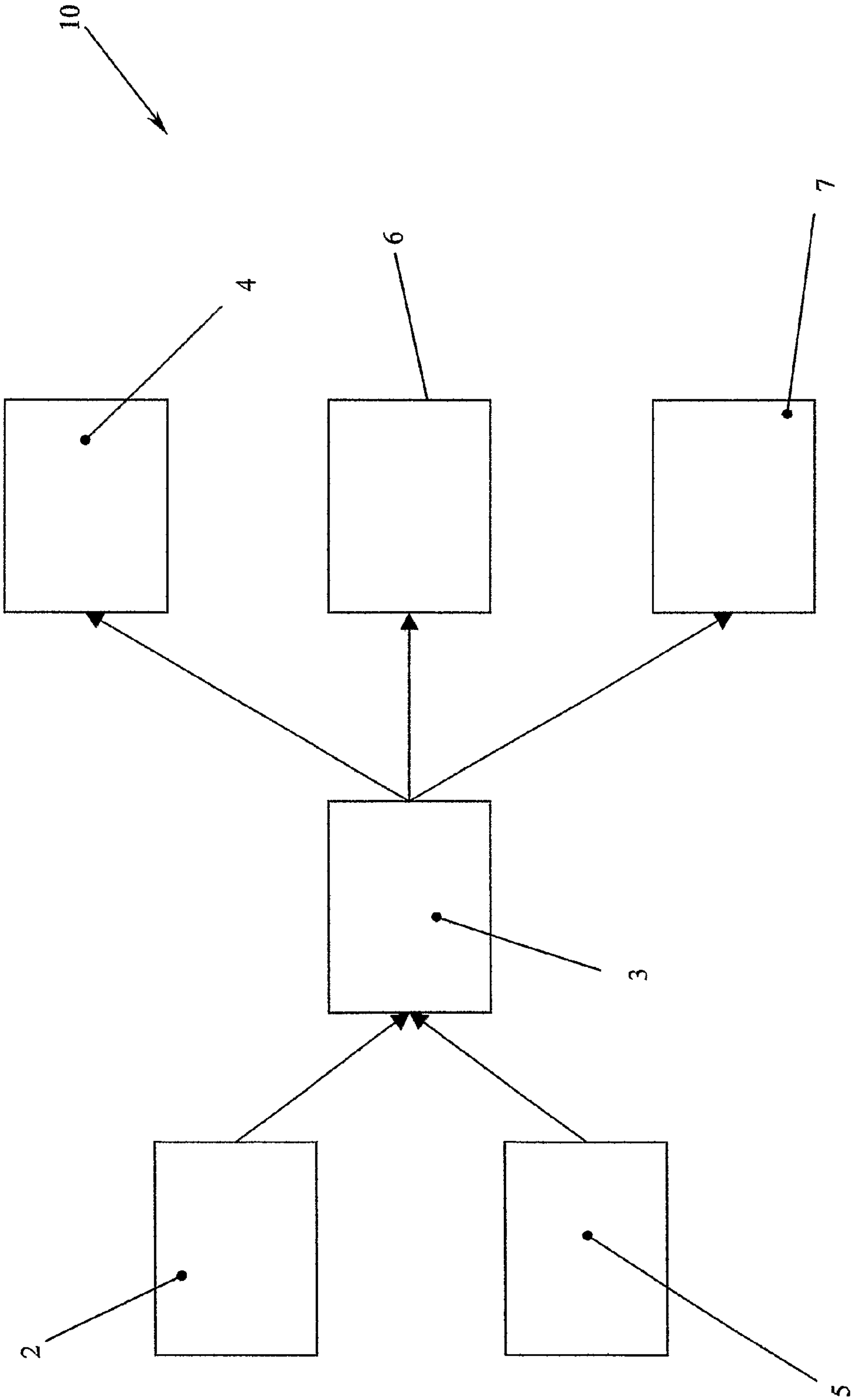
FIG. 1 shows a block diagram showing the functional components of a preferred embodiment of a remote control of the remote control system according to the present invention.

With particular reference to FIG. 1, it can be noted that the transmitting remote control 10 comprises at least means for manually entering data and/or commands by an operator, such as for example at least one keyboard 2, processing means, such as for example at least one microcontroller 3, at least one inclinometer or inclination sensor 5 able to send to the processing means, such as the microcontroller 3, information related to a position in space, for example with respect to a Cartesian reference system, of the transmitting remote control 10, and transmitting means of at least one command, control and regulation signal to the receiver 20 depending on position information of the remote control 10 itself. In particular, space position information of the transmitting remote control 10 can be transmitted as inclination value for a following post-processing or processed by the transmitting remote control 10 itself before being transmitted (for example in case of command inhibition on a high handling speed).

It can be advantageously provided that, without the pressure of a pushbutton on the keyboard 2 by an operator, it is not possible to transmit commands to the receiver 20. The pieces of information of a pushbutton pressed on the keyboard 2 are then sent to the microcontroller 3 that, upon pressing the pushbutton, will start processing inclination information coming from the inclination sensor 5 to use them in the modes described below.

Information about a pressed pushbutton together with the measure of the degree of inclination of the transmitting remote control 10 measured by the inclination sensor 5, with respect for example to a Cartesian reference system, will be transmitted to the receiver 20 through wires or radio by means of the transmitting means 4.

In addition, the degree of inclination detected by the inclination sensor 5, can be communicated to the operator through at least one warning horn 6 that will change its sound acoustic intensity or frequency proportionally to the inclination reached by the remote control 10. It is also possible to provide for the use of luminous indicators 7 to communicate to the operator the degree of inclination of the transmitting remote control 10 measured by the inclination sensor 5 with respect to a Cartesian reference system, such as for example luminous bars or LED-type graduated scales or graphic displays. In particular, the keyboard 2, that transmits data related to the commands to be sent, can preferably contain both control pushbuttons and luminous indicators 7.

Figure 2:
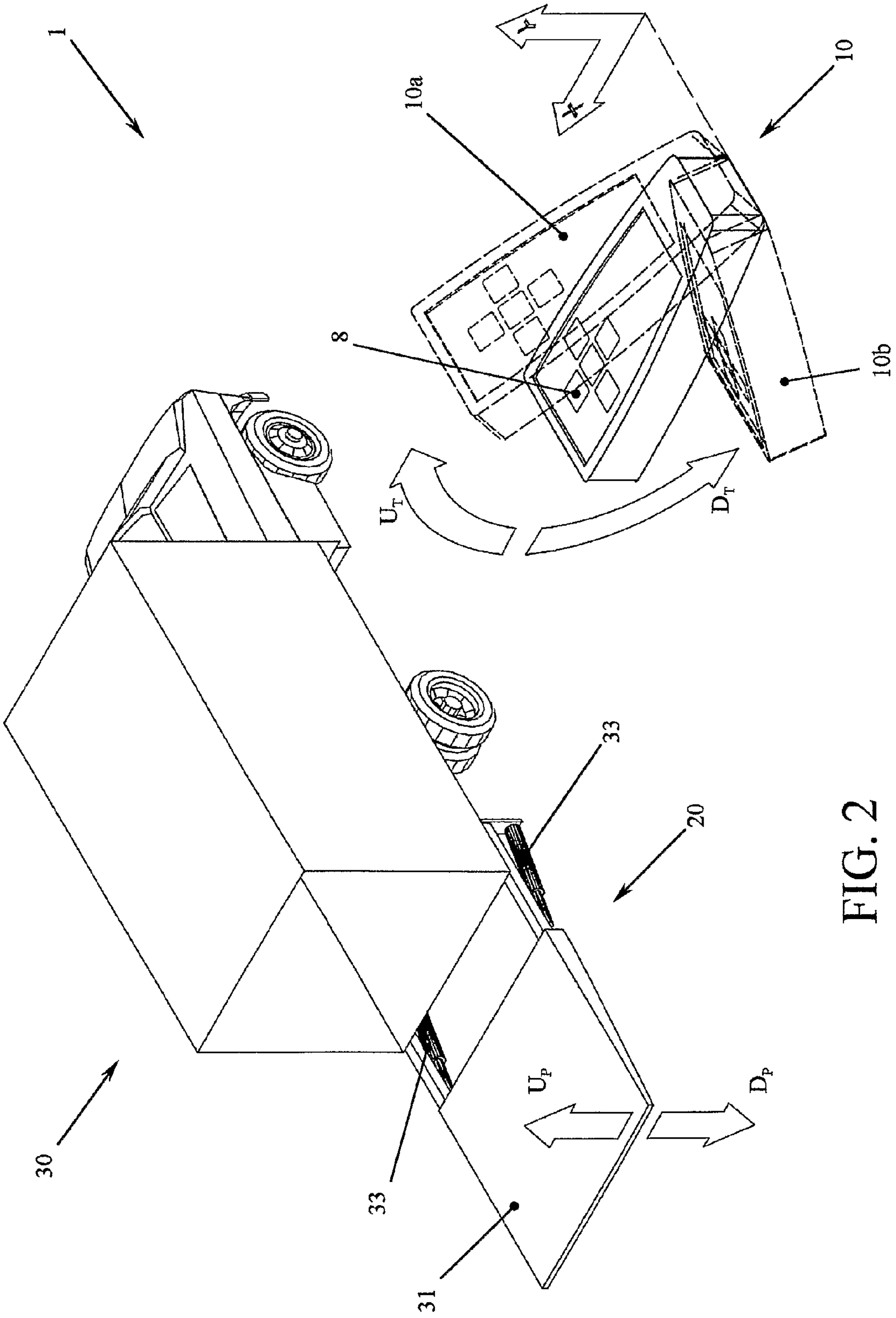
FIG. 2 shows a possible operating mode of the remote control system according to the present invention.
Figure 3:
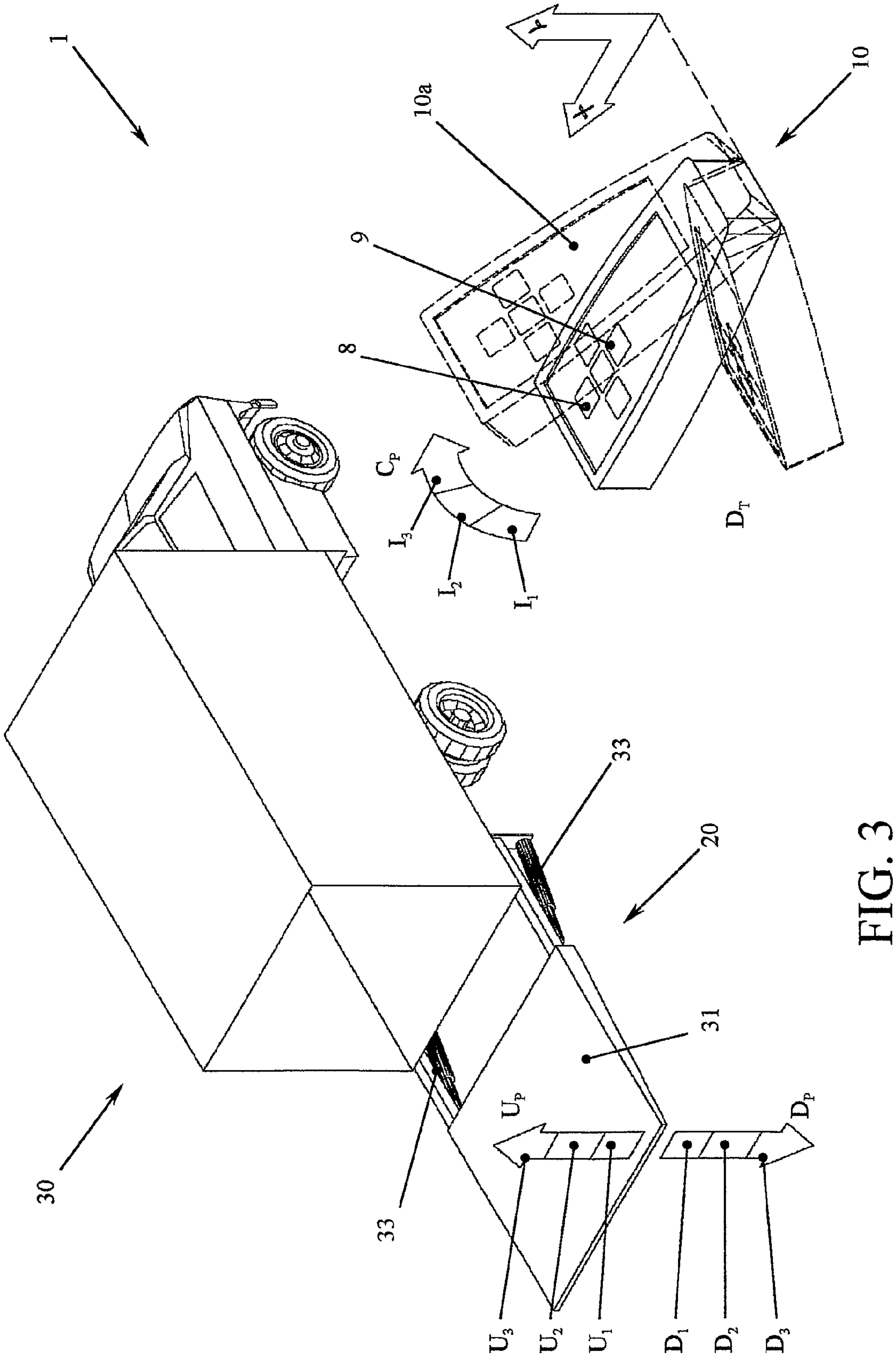
FIG. 3 shows another possible operating mode of the remote control system according to the present invention.

With reference now to FIGS. 2 and 3, it is possible to note two preferred operating modes of the system 1 according to the present invention applied for controlling the drive of a hydraulic board 31 of a transporting industrial vehicle 30. In this case, the receiver 20 will operatively cooperate with the hydraulic actuators 33 of the hydraulic board 31, in technical modes known and within the grasp of any technician in the field, to drive its movement depending on command, control and regulation signals received by the transmitting remote control 10 actuated by an operator.

With particular reference to FIG. 2, it is possible to note an operating mode of the system 1 of the ON/OFF type in which, upon pressing a pushbutton 8 of the remote control 10 and under a certain rotary and/or inclination movement of the remote control 10 by an operator, a corresponding linear movement of the drive controlled by the receiver 20 is associated: in this case, the system, by detecting the inclination of the remote control 10 through the inclination sensor 5, doubles the meaning of a single pushbutton 8 pressed on the keyboard 2 and at the same time makes the command more "natural". For example, if it is necessary to perform a lifting/lowering movement of the hydraulic board 31, by inclining the remote control 10 with its tip lifted with respect to the ground or to a previously-defined Cartesian reference system XY (such as for example according to arrow $U_T$ in FIG. 2 to take the remote control 10 to the dashed position 10*a*), the pressed pushbutton 8 can assume the meaning of "lifting" of the hydraulic board 31 and determine the transmission of a control signal related to the receiver 20 that will take care of lifting the hydraulic board 31 (according, for example, arrow $U_p$ in FIG. 2) inducing the drive of hydraulic actuators 33; instead, by inclining the remote control 10 with its tip oriented towards the ground or downwards with respect to the previously-defined Cartesian reference system XY (such as, for example, according to arrow $D_T$ of FIG. 2 to take the remote control 10 to the dashed position 10*b*), the pressed pushbutton assumes the meaning of "lowering" of the hydraulic board 31 (according, for example, arrow $D_P$ of FIG. 2). Obviously, the combination between different inclination movements of the remote control 10 detected by the inclination sensor 5 with the pressure of one or more pushbuttons of the keyboard 2 can generate a very high number of command meanings and the production of related control signals to be transmitted to the receiver 20, that will convert them into commands to various actuators cooperating therewith: for example, if it is desired to drive output/return of the hydraulic board 31, this can be done by inclining the remote control 10 rightwards with respect to the ground or the previously-defined Cartesian reference system XY keeping the pushbutton 8 pressed: such combination can therefore assume the meaning of "hydraulic board 31 output" and determine the transmission of a related control signal to the receiver 20 that will take care of outputting the hydraulic board 31 inducing the drive of the hydraulic actuators 33. By instead inclining the remote control 10 leftwards with respect to the ground of the previously-defined Cartesian reference system XY and keeping the pushbutton 8 pressed, one will be able to determine the meaning of "hydraulic board 31 return".

According to this operating mode, it is clear that the system 1 allows, in addition to halving the number of necessary keys for handling with consequent reduction of the remote control 10 size, making the operation carried out by the operator to perform the desired function, more natural.

Instead, with reference to FIG. 3, it is possible to note an operating mode of the system 1 of the proportional type, in which, upon pressing a pushbutton 8 or 9 of the remote control 10 and with the intensity or speed of a certain rotary and/or inclination movement of the remote control 10 by an operator, a corresponding movement of the drive controlled by the receiver 20 is associated and is proportional to such intensity or speed. In this case, assuming to start with the measure of the remote control 10 inclination upon pressing a movement-selecting pushbutton 8 or 9, the system translates the degree of inclination downwards/upwards, rightwards/leftwards imparted to the remote control 10 and detected by the inclination sensor 5 into a request for a plus or minus change of the proportional command (in case, for example, of speed change commands of moving members); everything will occur depending on the pushbutton 8 or 9 pressed by the operator.

For example, in case of a movement proportional command, depending on the degree of rotation/inclination of the remote control 10 (according, for example to arrow $C_P$ of FIG. 3 in which three different degrees of inclination are shown), the system 1 can define a value, for example expressed in percentage, of the movement speed to be conferred to the controlled drive, such as for example the hydraulic board 31 (according, for example, to arrows $U_P$ or $D_P$ in FIG. 3 in which three different levels of lifting or lowering speed are shown), that can have both a proportional and an exponential behaviour. It can be provided that, if the rotation/inclination movement imparted to the remote control 10 by the operator is too quick, the drive movement is inhibited and it is necessary to start again from the beginning of the movement command.

Specifically, to lift the hydraulic board 31, the operator will press the lifting pushbutton 8 on the keyboard 2 of the remote control 10: the inclination amount or the inclination speed detected by the inclination sensor 5 (for example according to three increasing levels $I_1$, $I_2$ or $I_3$ to take the remote control 10 to the dashed position 10*a*) will determine a lifting of the hydraulic board 31 at a proportional translation speed (for example the three incremental levels or ramps $I_1$, $I_2$ or $I_3$ can be corresponding to three increasing lifting speeds, respectively $U_1$, $U_2$ or $U_3$). Similarly, to lower the hydraulic board 31, the operator will press the lowering pushbutton 9 on the keyboard 2 of the remote control 10: the inclination amount or the inclination speed detected by the inclination sensor 5 (for example according to the three previous increasing levels $I_1$, $I_2$ or $I_3$) will determine a lowering of the hydraulic board 31 at a proportional translation speed (for example, the three incremental levels or ramps $I_1$, $I_2$ or $I_3$ can be corresponding to three increasing lowering speeds, respectively $D_1$, $D_2$ or $D_3$). A similar reasoning is valid for any other movement that has to be conferred to the drive controlled by the system 1 of the present invention.

The operator has the feeling of the control percentage from the warning horn 6 whose sound can have an intermittence and/or a volume related to the degree of inclination of the remote control 10, or from the luminous indicators 7, such as with graduated LED-type scale that displays the percentage value, or a display that numerically and/or graphically displays the percentage inclination value of the remote control 10.

The invention claimed is:

1. A remote control system for regulating and controlling a mechanical drive, wherein the remote control system comprises at least one transmitting remote control and at least one receiver which cooperates with the mechanical drive, the transmitting remote control containing at least one inclination sensor;

wherein the transmitting remote control comprises:

a) means for manually entering data by an operator, for manually entering commands by an operator or for manually entering both data and commands by an operator;

b) processing means, where the at least one inclination sensor is adapted to send to the processing means information related to a position in space of the transmitting remote control; and c) transmitting means of at least one command, control and regulation signal to the receiver;

wherein the means for manually entering data by an operation, for manually entering commands by an operator or for manually entering both data and commands by an operator comprise at least one keyboard;

wherein the processing means comprises at least one microcontroller;

wherein a piece of information about a pushbutton pressed on the keyboard is sent to the microcontroller that starts processing a piece of information about an inclination detected by the inclination sensor, where the piece of information about the pressed pushbutton together with a measure of the inclination of the transmitting remote control measured by the inclination sensor being transmitted to the receiver through the transmitting means;

wherein the remote control system has an operating mode of an ON/OFF type in which a corresponding linear movement of the mechanical drive is associated with pressure from a pushbutton of the remote control and with a rotary movement of the remote control, with an inclination movement of the remote control, or with both a rotary movement of the remote control and an inclination movement of the remote control; and wherein the remote control system has an operating mode of a proportional type in which a corresponding movement of the mechanical drive proportional to the intensity or the speed is associated with pressure from a pushbutton of the remote control and with an intensity or a speed of a rotary movement of the remote control, with an inclination movement of the remote control, or with both a rotary movement of the remote control and an inclination movement of the remote control.

2. The remote control system of claim 1, wherein the transmitting remote control comprises at least one warning horn to communicate to an operator a degree of the inclination detected by the inclination sensor, a variation of acoustic intensity or frequency being proportional to the inclination of the remote control.

3. The remote control system of claim 1, wherein the transmitting remote control comprises luminous indicators to communicate to an operator a degree of the inclination detected by the inclination sensor.

4. The remote control system of claim 3, wherein the luminous indicators comprise luminous bars or comprise graduated LED scales or comprise LED graphic displays, or comprise both luminous bars and LED scales or comprise both luminous bars and LED graphic displays.

* * * * *